United States Patent
MacDougall et al.

(10) Patent No.: US 8,352,761 B2
(45) Date of Patent: Jan. 8, 2013

(54) CONTROLLING A POWER STATE OF A DEVICE

(75) Inventors: Neil William MacDougall, Bristol (GB); Keir Shepherd, Bristol (GB); Lon Barfield, Bristol (GB); Ben Wynne, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 534 days.

(21) Appl. No.: 12/578,645

(22) Filed: Oct. 14, 2009

(65) Prior Publication Data

US 2011/0087903 A1    Apr. 14, 2011

(51) Int. Cl.
*G06F 1/00* (2006.01)

(52) U.S. Cl. .......................................................... 713/310

(58) Field of Classification Search ................... 713/310
See application file for complete search history.

(56) References Cited

U.S. PATENT DOCUMENTS

2004/0209625 A1* 10/2004 Haddrell .................... 455/456.1
2008/0162956 A1*  7/2008 Bozek et al. ................. 713/310

* cited by examiner

*Primary Examiner* — Paul R Myers
*Assistant Examiner* — Jeremy S Cerullo

(57) ABSTRACT

A method for controlling a power state of a host device, the method comprising operating a processor of a power control module integral to the host to perform operations comprising determining a current power state of the host from a plurality of possible states, receiving a remote request to alter the power state of the host device, and on the basis of the request, altering the power state of the host device from the current state to one other of the plurality of states of the host.

13 Claims, 4 Drawing Sheets

CONTROLLING A POWER STATE OF A DEVICE

BACKGROUND

Today, devices must be switched on in order that they can be interacted with. For example, in order to stream content around the home from a home media server or Network-attached storage (NAS) device, that device must be left powered on all of the time, even when it is not being used. Equally, wireless routers, broadband modems and other devices are often left on, even though their functions are not constantly in use.

There is an increasing focus on energy efficiency and awareness of consumption which is driving consumer interest. Consumer electronics companies are making much of the ability to wirelessly access and interact with devices throughout homes and offices. The major drawback is that all devices must be switched on permanently in order that they can be used—wireless printing, wireless streaming of media, transferring content between media servers and PCs, accessing the Internet through a broadband router are all examples.

There are many prior solutions in the area of Home Automation (such as X10 and Insteon for example) that allow devices to be remotely switched on and off. These are all based on the provision of inserting a new device between the device to be controlled and the mains power outlet, and operate at the level of switching on and off the mains electricity supply. None of them are integrated into the device to be controlled and none of them allow communications with the device to be controlled. Since they work at the electricity supply level, they do not allow devices to be placed into low-power modes or woken from low-power modes and do not allow the power state of a device to be retrieved.

Other solutions such as Wake-On-Lan (WoLAN) function only for devices connected to a wired Ethernet network and require that the host device is connected to a mains power outlet. Wake-on-Wireless-Lan (WoWLAN) removes Wake-On-Lan's need for a wired network, but uses a standard wireless networking, which consumes a considerable amount of power, which makes it impractical for mobile devices. Both WoLAN and WoWLAN only permit devices to be woken from a low-power state and do not allow the state of a device to be queried, or for the device to be placed back into a lower-power state.

The ECMA (European Computer Manufacturers Association) has an activity: "Proxying Support for Sleep Modes" (TC32-TG21). Their proposal is based around a new device (a proxy) that specifically handles network traffic for ethernet-connected PCs that are in a low-power, sleep mode and wakes them if needed, based on the contents of network data.

Prior solutions in this space have typically been provided as new hardware which sits between the mains electricity supply and the device to be controlled. As a result, the cost of these devices has been relatively high, which is one of the main reasons that these solutions have not achieved any significant adoption.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figure 1:
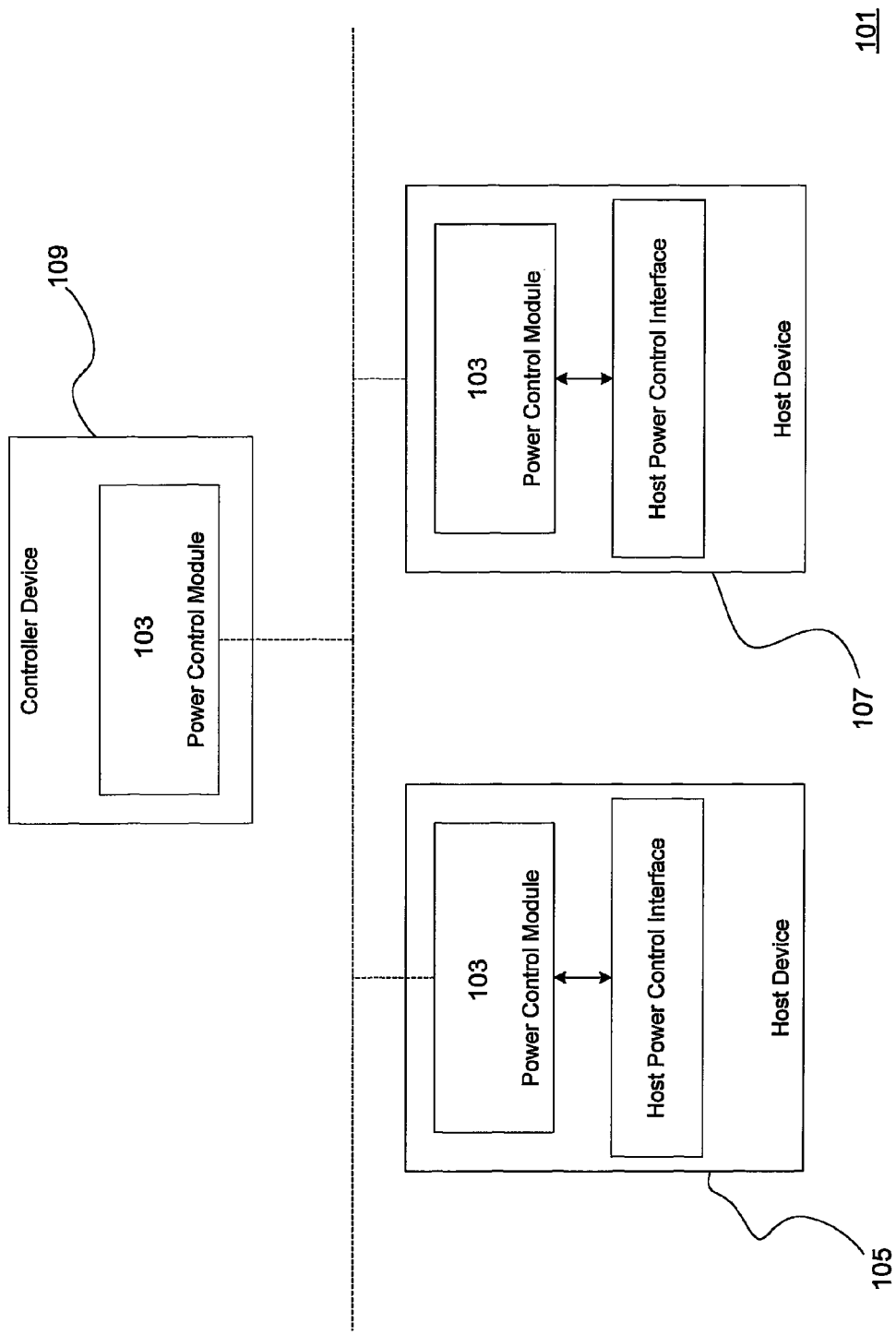
FIG. 1 is a schematic representation of a system according to an embodiment.

Most power control systems to date are based around mains and other adapters that sit between the electrical supply and the device, to enable the device to be switched on or off (and in some cases for its energy usage to be monitored). They do not allow for a finer grain of power control (i.e., the mains supply is switched on or off, power modes such as standby and hibernate can not be controlled).

According to an embodiment, a power control module is embedded in a host electronics device and communicates directly with the device. The host electronics device can be a desktop PC, laptop, television, set-top box, printer or media server for example. Other alternatives are possible. A power control module can be provided as a USB device for some device classes, such as desktop PCs, laptops etc.

The power control module according to an embodiment allows the power state of host devices to be read and controlled, and can be used in home and office situations. However, its applicably is not limited to these situations as will be appreciated by those skilled in the art.

According to an embodiment, power control modules operate over a low-power wireless network which allows modules to communicate with each another. The module is self contained but communicates with the host device in order that:

The host device can obtain the unique ID of the module which is embedded within it;

The module can determine the power state of the host device (Off, Sleep, Standby, On for example)

The module can control the power state of the host device;

The host device can use the module to control other modules (where required).

The host device allows the module to control and query its power state. The module is powered by battery for devices that should not consume any power when powered off (e.g. laptop). For mains-connected devices, the module is operable to draw a very small amount of power from the mains supply, while the host device draws what is needed for its current power state (e.g. nothing when powered off, low current when in standby mode).

A module can act as a controller or a device node. Any suitably enabled device can use the controller mode to read and control the power state of any other enabled device. Each module has a globally unique identifier that allows it to be addressed by other modules. A power control module itself does not provide a discovery mechanism—in order for two modules to communicate the controlling module must know the ID of the module it wishes to control. Since it is integrated into host devices, the host device is able to retrieve the ID of the attached module. This allows other discovery protocols (such as ZeroConf, UPnP) to be used to discover devices and for the ID to be included in discovery responses.

In some situations, a power control module can be used to power-on devices from cold (i.e. fully powered off). In these cases, the time taken for the host device to become operational can be considerable. In order to support this, a query capability of a power control module will report the current power status of the host device (e.g. Powering On) and will optionally include an estimate of the time it will take to reach the desired power state.

According to an embodiment, the system can be implemented using existing low-power wireless technologies, such as ZWave and ZigBee for example. The system provides a protocol on-top of these wireless technologies to support remote power control. For most applications in the home or office, the range of these existing technologies (~100 M) is sufficient.

A key consideration will be keeping power consumption to an absolute minimum. The system predominately operates in a receive mode, listening for requests to change the power state. Only requests to query the power state require a response that must be transmitted. Response messages will keep data to an absolute minimum to reduce the time that the transmitter must be switched on for.

The system according to an embodiment comprises a number of techniques to reduce power consumption when listening, including periodically switching on the receiver to listen for messages, rather than constantly being in a receive mode as well as utilizing other sensors (e.g. ambient light sensors) to reduce the polling frequency (e.g. to listen for protocol messages less frequently when a device is in a dark room).

The system provides a mechanism for securing the control of modules, to prevent unauthorized users from controlling the power state of a user's devices. Since there is no discovery mechanism, a user is required to know the module identifier of the device that they wish to control. This provides an initial barrier to prevent arbitrary control of devices. Modules can be configured with a group identifier and associated pin (analogous to a username and password). When employed, a module can only be controlled if the controlling device presents the correct group and pin information.

FIG. 1 is a schematic representation of a system 101 according to an embodiment. More specifically, FIG. 1 shows an example of a power control module 103 embedded in two host devices 105, 107 and a controller device 109. As an example, the host devices could be a printer and a media server. The controller device is an example of a device that can use a power control module to control and query other control modules, but which can not be controlled itself, for example, a remote control unit.

Both Host and Controller devices contain a power control module 103. This is the separate module that provides the power control functionality. For Host Devices, the Host Power Control Interface provides the module 103 with the appropriate interface to allow it to query the power status of the host device and to control the power status. Additionally, module 103 provides the Host Power Control Interface with a unique identifier, such that the host device can query its own identifier. Identifiers are used according to an embodiment to uniquely identify modules (thus host devices and controllers) and to send requests wirelessly between modules.

Figure 2:
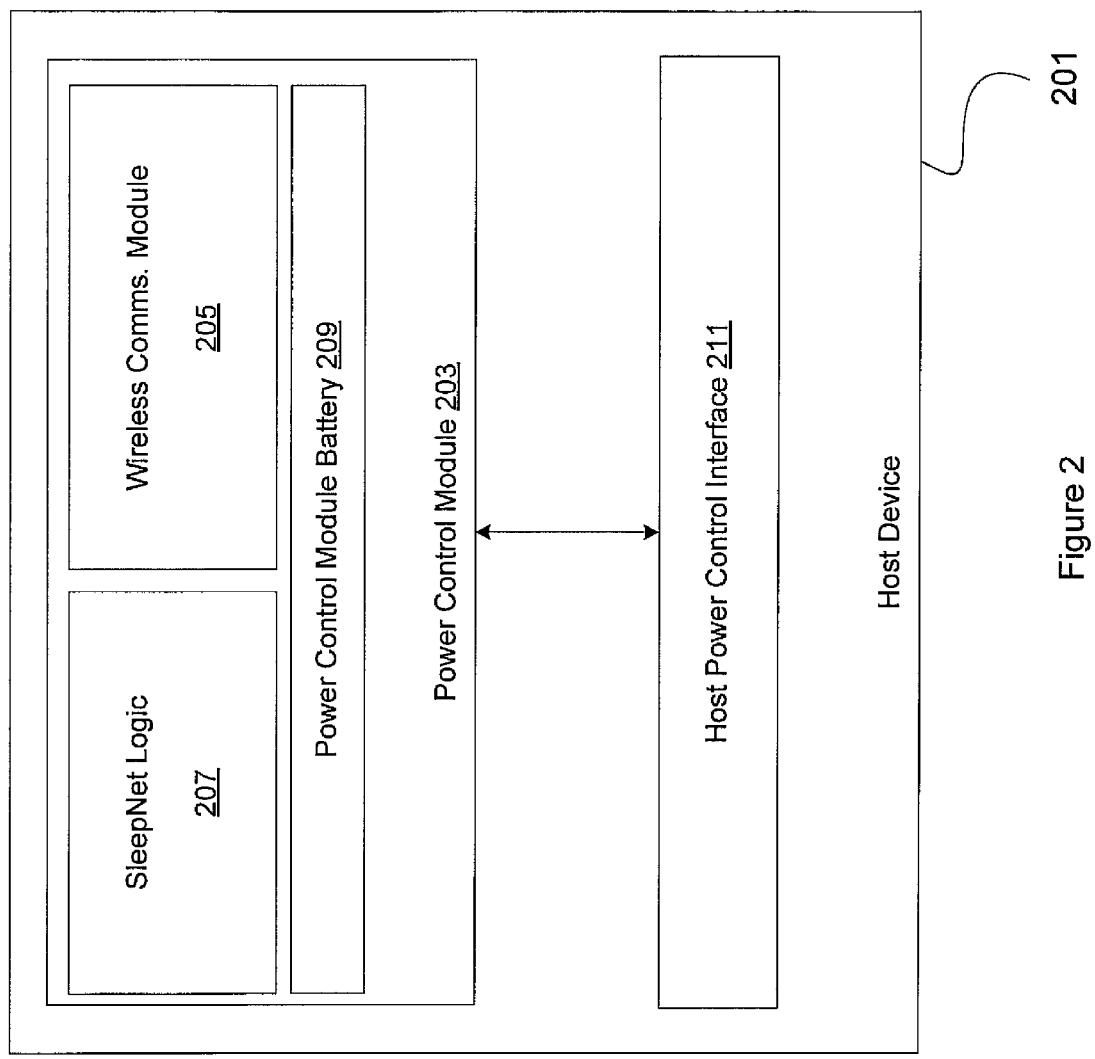
FIG. 2 is a schematic representation of a host device according to an embodiment.
Figure 3:
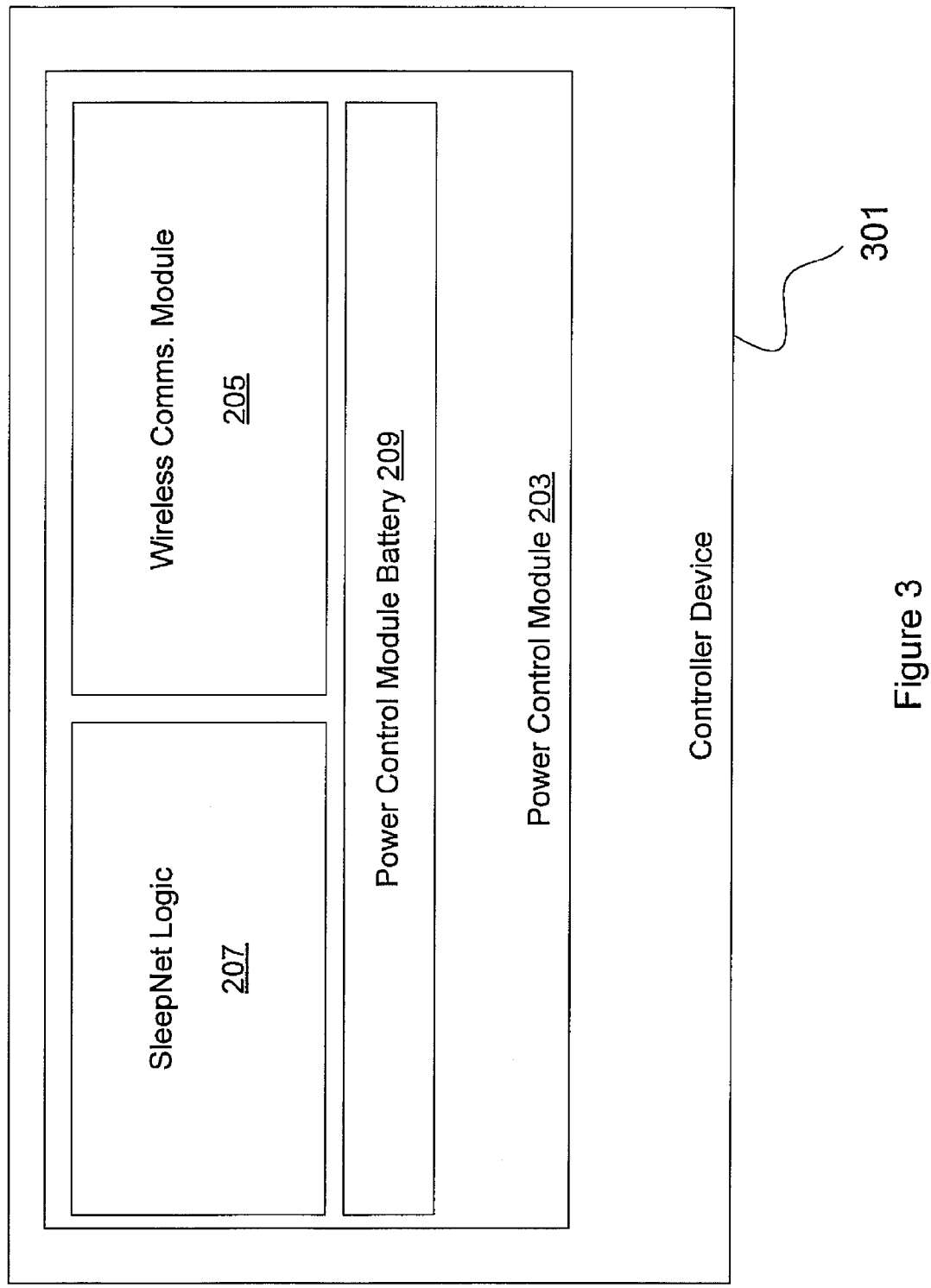
FIG. 3 is a schematic representation of a controller device according to an embodiment.

FIGS. 2 and 3 depict the components of a power control module for the two cases of a host device and a controller respectively. The purpose of the Host Power Controller Interface is as described above.

The power control module 203 for a host 201 or control 301 device comprises three main components—a low-power wireless communication module 205 (which could use ZigBee, for example), a logic component 207 and a battery module 209.

The battery module 209 provides a separate power source that can keep the power control module 203 powered independently of the host device 201. According to some embodiments, where this is not required (e.g. where the host device is always able to obtain power from a mains supply), the battery can be omitted. The battery can be recharged by the host device as and when it is powered by the mains supply.

The logic module 207 provides the control logic for the module 209. According to an embodiment, this can be manifested as an embedded microcontroller/microprocessor that is powered by the battery module. It listens for incoming requests from the wireless communications module 205 and processes these, using the host power control interface (211) where needed.

For controller functionality, requests are sent to the power control module 203 and processed by the logic 207, which sends requests to the wireless communication module 205. Each request must have the identifier of the target module 203. The wireless communication module 205 ensures that the request is sent to the correct target module, where it is handled by the logic there.

Embodiments of a power control system as described herein can be implemented by one or more discrete modules (or data processing components) that are not limited to any particular hardware, firmware, or software configuration. In the illustrated embodiments, the modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

In some implementations, process instructions (e.g., machine-readable code, such as computer software) for implementing the methods that are executed by the embodiments of the system described herein, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the power control system can be implemented in any one of a wide variety of electronic devices, including desktop and workstation computers, digital still image cameras, digital video cameras, printers, scanners, and portable electronic devices (e.g., mobile phones, laptop and notebook computers, and personal digital assistants) for example. Due to its efficient use of processing and memory resources, some embodiments can be implemented with relatively small and inexpensive components that have modest processing power and modest memory capacity. These embodiments also are suitable for incorporation into compact device environments that have significant size, processing, and memory constraints, including but not limited to handheld electronic devices (e.g., a mobile telephone, a cordless telephone, a portable memory device such as a smart card, a personal digital assistant (PDA), a solid state digital audio player, a CD player, an MCD player, a game controller, a pager, and a miniature still image or video camera), pc cameras, and other embedded environments.

Figure 4:
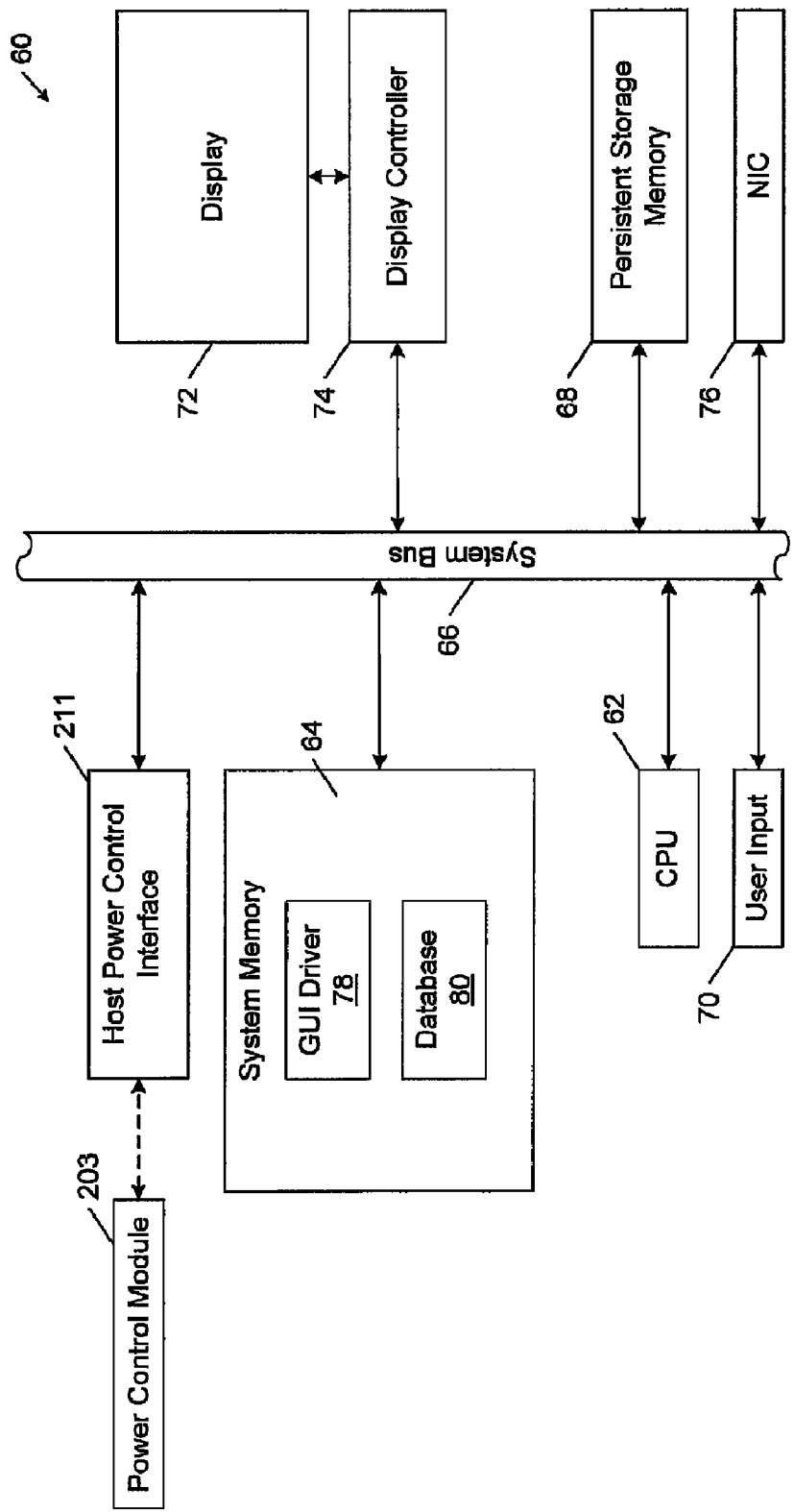
FIG. 4 shows an embodiment of a computer system that incorporates any of the embodiments of the power control system described herein.

FIG. 4 shows an embodiment of a computer system 60 that incorporates any of the embodiments of the power control system described herein. The computer system 60 includes a processing unit 62 (CPU), a system memory 64, and a system bus 66 that couples processing unit 62 to the various components of the computer system 60. The processing unit 62 typically includes one or more processors, each of which may be in the form of any one of various commercially available processors. The system memory 64 typically includes a read only memory (ROM) that stores a basic input/output system (BIOS) that contains start-up routines for the computer system 60 and a random access memory (RAM). The system bus 66 may be a memory bus, a peripheral bus or a local bus, and may be compatible with any of a variety of bus protocols, including PCI, VESA, Microchannel, ISA, and EISA. The computer system 60 also includes a persistent storage memory 68 (e.g., a hard drive, a floppy drive, a CD ROM drive, magnetic tape drives, flash memory devices, and digital video disks) that is connected to the system bus 66 and contains one or more computer-readable media disks that provide non-volatile or persistent storage for data, data structures and computer-executable instructions.

A user may interact (e.g., enter commands or data) with the computer 60 using one or more input devices 70 (e.g., a keyboard, a computer mouse, a microphone, joystick, and touch pad or any other suitable device). Information may be presented through a graphical user interface (GUI) that is displayed to the user on a display monitor 72, which is controlled by a display controller 74. The computer system 60 also typically includes peripheral output devices, such as speakers and a printer. One or more remote computers may be connected to the computer system 60 through a network interface card (NIC) 76.

As shown in FIG. 4, the system memory 64 also stores the power control system, a GUI driver 78, and optionally a database 80 containing intermediate processing data, and output data for example. In some embodiments, the power control system can interface with the GUI driver 78 and the user input 70 to control a change of power state for a device.

Accordingly, there is provided a system for the control of power supply to a host device which allows the power state of the host device to be controlled to a fine level of granularity, allowing the host device to be both switched on and off as well as placed into a low-power mode. The use of a dedicated low power wireless communications technology allows the system to work in both battery-powered mobile devices and mains power connected devices without causing significant battery drain or energy consumption. By integrating a power control module according to an embodiment with the host device, smart applications of power control can be enabled, enhancing many existing technologies. For example, integration with UPnP can allow a Television to access and play content stored on a remote PC, without the PC having to be switched on all of the time. This therefore removes the requirement for devices to be constantly powered on.

It will be appreciated that whilst various embodiments have been described herein with reference to a power control module which is embedded in a host device, other alternatives are possible. For example, according to an embodiment, a power control module for determining and controlling a power state of a device can be implemented in the form of a plug-in type device, such as a USB 'stick' of a PCI-E card for example. That is to say, the controller and the host can be realized as a standalone device (such as a USB stick for example) or as an embedded component in a device as described above. In the case of a standalone device, the device is operable to maintain backwards compatible with (some) other devices (mainly PCs/Laptops which support wake from USB for example). Alternatively, a standalone power control module can be realized as a PCI-E card that can be added to desktop PCs for example (or Media Servers etc) and which can therefore utilize the standard PCI-E power functions to wake the host device. A standalone device which is plugged into a host device will become integral to the host. In either instantiation, the power control module need not explicitly sit directly between the host device and a power source as it functions to control power supply at a more intelligent level than simply "on/off".

The system is integrated into the host device, and therefore the cost to consumers will be relatively low. By not requiring additional hardware to be purchased and configured, the adoption of this technology can be much higher than prior solutions.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims below.

What is claimed is:

1. A method for controlling a power state of a host device, the method comprising operating a processor of a power control module integral to the host device to perform operations comprising:
   determining a current power state of the host device from a plurality of possible states;
   receiving a remote request to alter the power state of the host device;
   on the basis of the request, altering the power state of the host device from the current state to one other of the plurality of states of the host device; and
   reporting an estimate of a time to reach the other of the plurality of states of the host device.

2. A method as claimed in claim 1, wherein the power control module comprises a unique identifier, the method further comprising:
   using the unique identifier to effect communication between the power control module and a further power control module integral to a second host device.

3. A method as claimed in claim 2, wherein communication is effected using respective wireless communication modules of the power control modules.

4. A method as claimed in claim 2, wherein the host device is to retrieve the unique identifier from the power control module and to supply the retrieved identifier as part of a device discovery process in response to a discovery request using a discovery protocol.

5. A method as claimed in claim 1, wherein the power control module operates in a low power receive mode to receive only data representing a request to alter a power state of the host device.

6. A method as claimed in claim 5, further comprising:
   at least one of:
   periodically switching on a receiver of the power control module to listen for requests; and
   utilizing one or more sensors of the power control module to reduce a polling frequency of the module.

7. The method of claim 1, further comprising supplying power to the power control module from a power source independent of the host device.

8. A power control module for use with a host device for controlling a power state of the host device, the power control module comprising:
   a host power control interface for communicating with the host device;
   a low-power wireless communication module; and
   a logic component module for processing requests received from the wireless communication module; wherein the wireless communication module is to receive a signal indicating that a change in the power state of the host device is desired and communicate the same to the logic component in order to effect a the desired change of power state to one other of a plurality of states of the host device;

wherein the logic component module is further to report an estimate of a time to reach the other of the plurality of states of the host device.

9. A power control module as claimed in claim 8, wherein the power control module is integral to the host device.

10. A power control module as claimed in claim 8, further comprising a battery power module for powering the module independently of the host device.

11. The power control module of claim 8, further comprising:

a battery module to provide power to the power control module independent of the host device.

12. The power control module of claim 8, further comprising:

an ambient light sensor to reduce a polling frequency of the power control module.

13. A non-transitory medium storing computer-readable instructions, that when executed are to cause a processor to control a power state of a host device, said computer-readable instructions comprising code to:

determine a current power state of a host device from a plurality of possible states of the device, the apparatus embedded within the host;

receive a remote request to alter the power state of the host device; and on the basis of the request, alter the power state of the host device from the current state to one other of the plurality of states of the host and report an estimate of a time to reach the other of the plurality of states of the host device.

* * * * *

UNITED STATES PATENT AND TRADEMARK OFFICE
CERTIFICATE OF CORRECTION

PATENT NO.       : 8,352,761 B2
APPLICATION NO.  : 12/578645
DATED            : January 8, 2013
INVENTOR(S)      : Neil William MacDougall et al.

It is certified that error appears in the above-identified patent and that said Letters Patent is hereby corrected as shown below:

In the Claims:

In column 7, line 3, in Claim 8, after "effect" delete "a".

Signed and Sealed this
Fourteenth Day of May, 2013

Teresa Stanek Rea
*Acting Director of the United States Patent and Trademark Office*